April 23, 1968  C. A. UNCAPHER ET AL  3,379,045
COIN AND TRIM MACHINE
Filed April 4, 1966  5 Sheets-Sheet 1

Inventors:
Charles A. Uncapher,
Ronald H. Roulo,
By Orrick, Lockwood, Grunawalt & Dewey
Attys

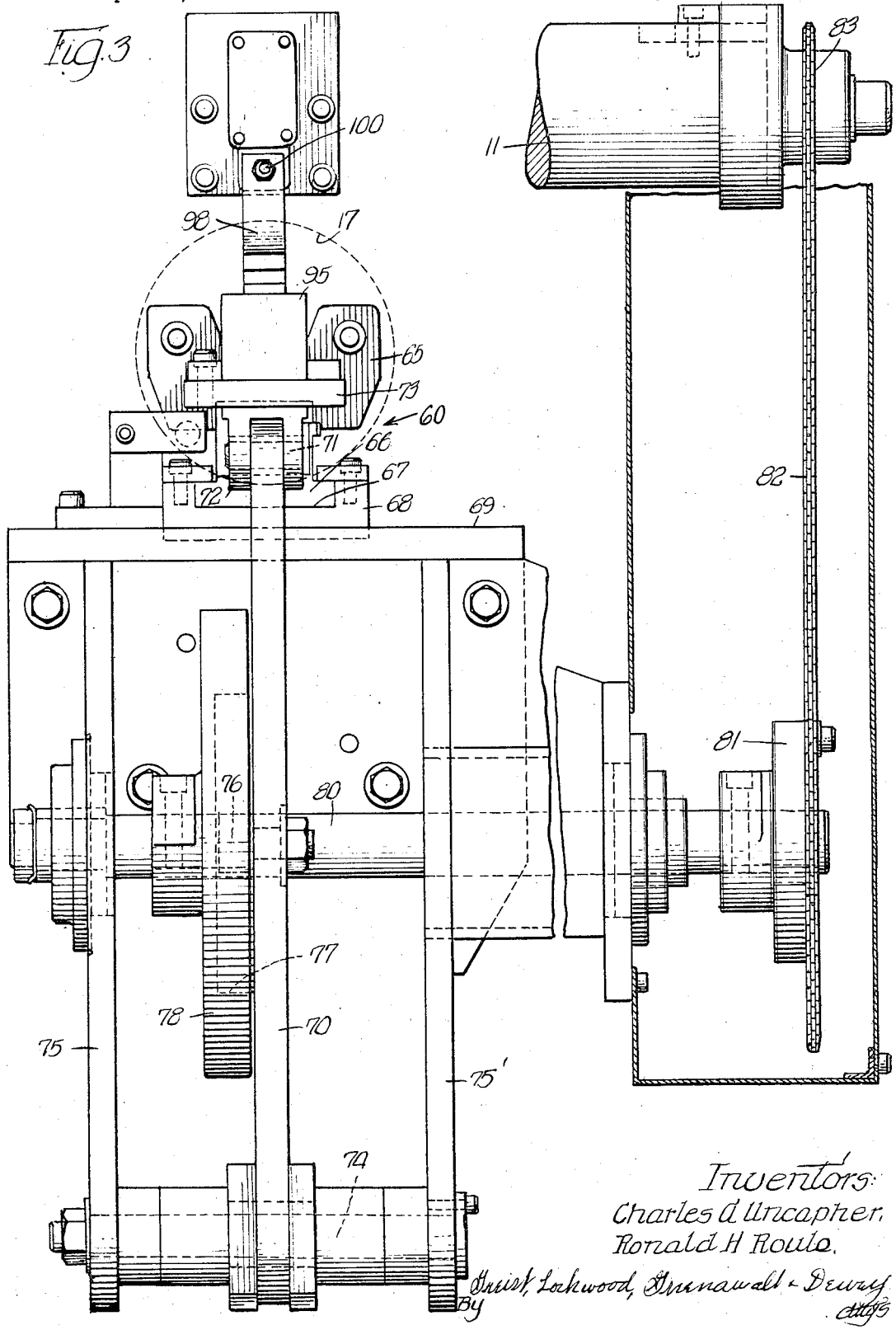

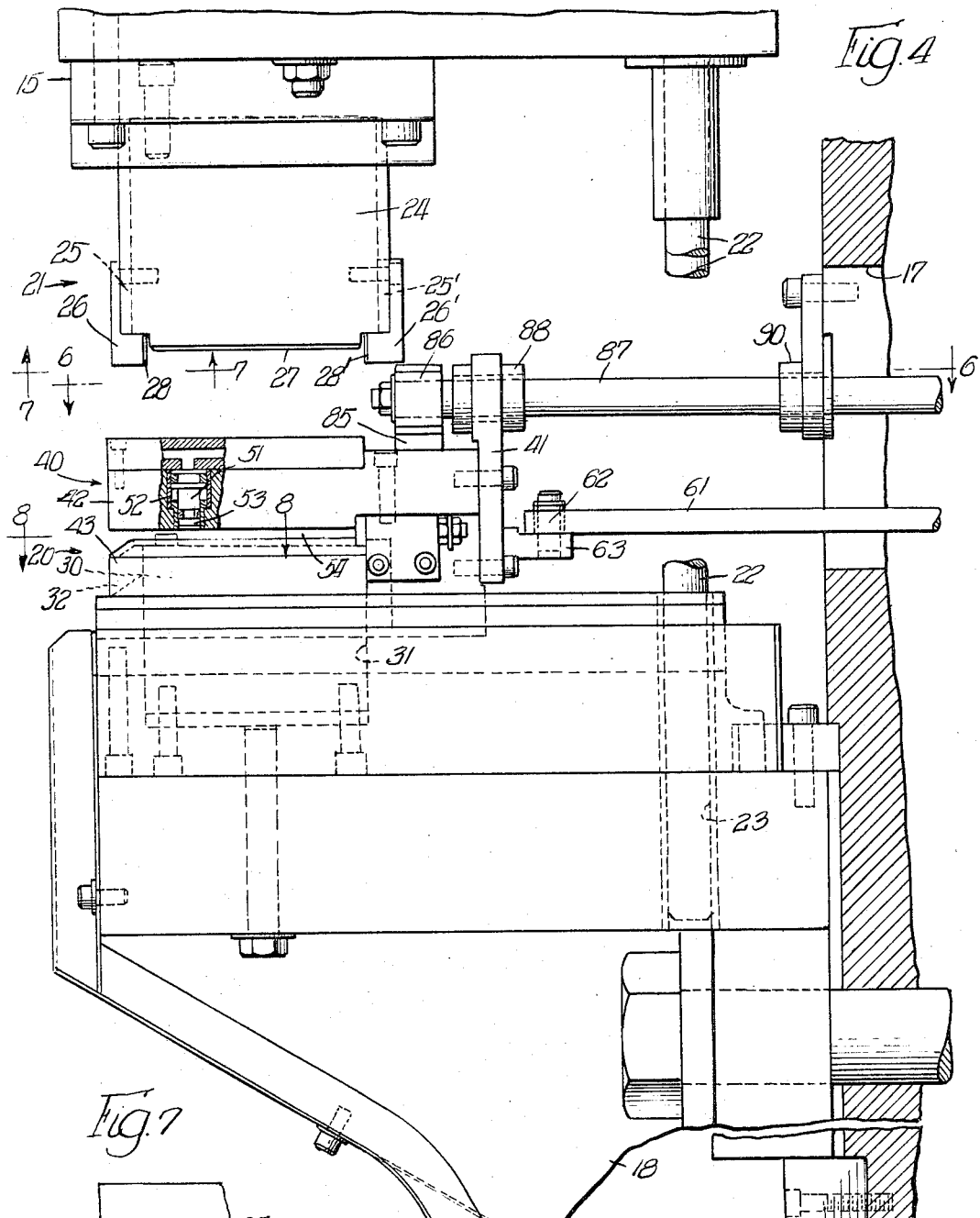
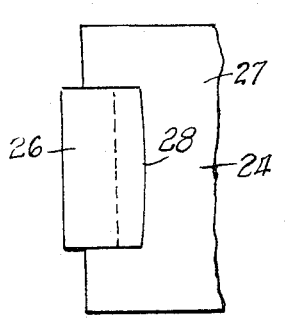

April 23, 1968 C. A. UNCAPHER ET AL 3,379,045
COIN AND TRIM MACHINE
Filed April 4, 1966 5 Sheets-Sheet 4

Inventors:
Charles A. Uncapher,
Ronald H. Roulo.
By Burst, Lockwood, Brunavalt & Drury
atty.

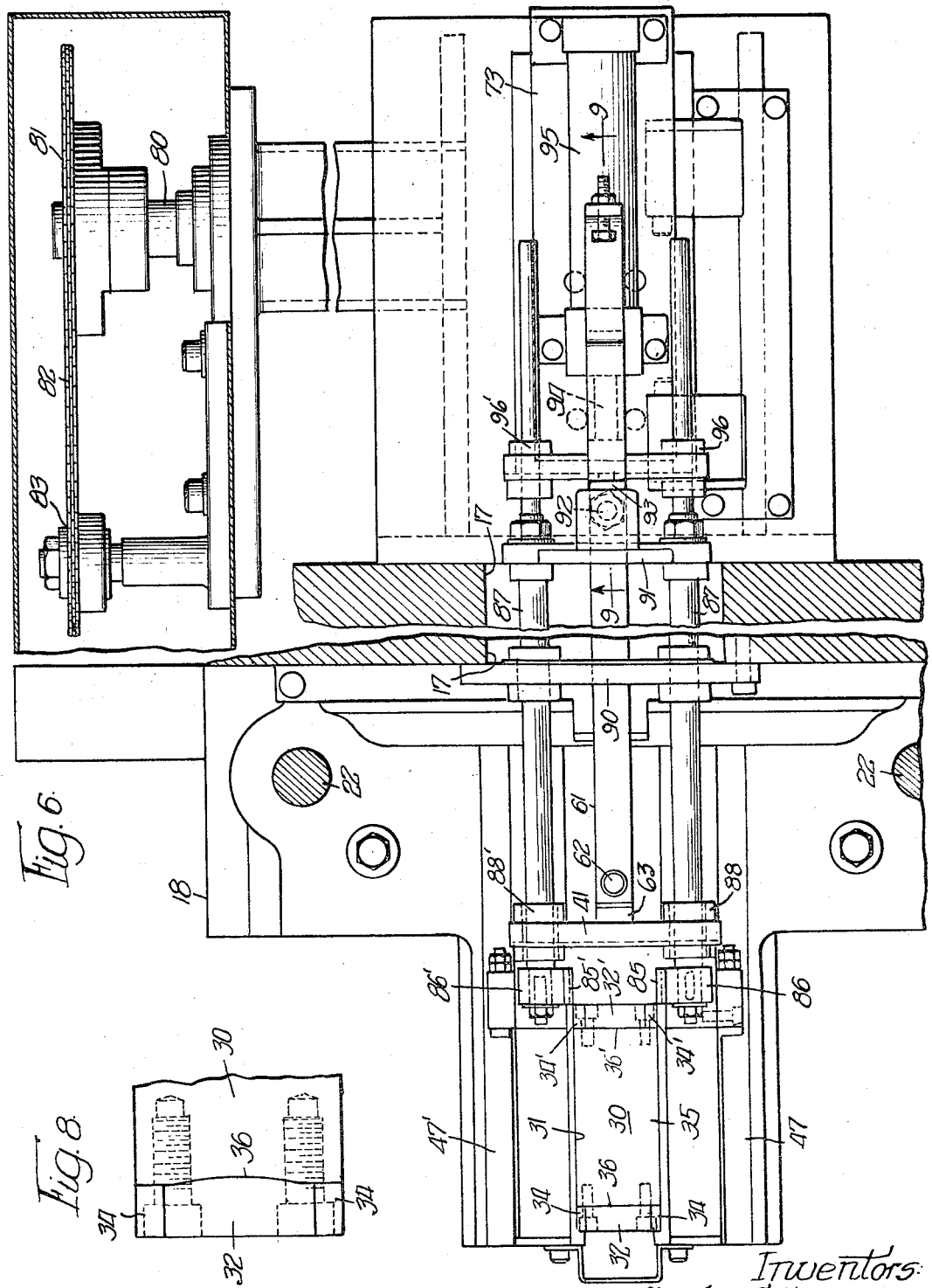

United States Patent Office

3,379,045
Patented Apr. 23, 1968

3,379,045
COIN AND TRIM MACHINE
Charles A. Uncapher, Oak Lawn, and Ronald H. Roulo, Palos Heights, Ill., assignors to Continental Can Company, Inc., New York, N.Y., a corporation of New York
Filed Apr. 4, 1966, Ser. No. 539,998
16 Claims. (Cl. 72—332)

This invention relates to the manufacture of products from metal strip material and is more particularly concerned with improvements in machinery for use in connection with the fabrication of welded joints connecting ends of the strip material.

In the manufacture of certain products from metal strip material, for example, steel chime bands for the ends of fiber drums, it has been found desirable to join the ends of the band forming steel strips by a mash seam weld which is obtained by passing overlapped margins of the strip ends between roller electrodes which form the weld by heat and pressure and thereafter to finish the operation by coining the weld area and trimming the edges of the strip material at the ends of the weld area to remove any projecting material and insure a smooth edge along the weld area. The mash seam welding operation results in a thickened section of the material in the weld area with projecting portions at opposite ends of the same, which are commonly referred to as "thumbnails." Both of these conditions are undesirable and it has been the practice to thin down the weld area and trim off the thumbnail projections by a coining and trimming operation. This operation, as previously performed, has been accomplished with coining and trimming dies which first trimmed off the thumbnail projections and then coined the weld area to reduce the thickness of the weld. This has resulted in frequent jamming of the material between the fixed trimming dies and the need for separate dies for each width of strip handled by the machine. An object of the present invention is to provide an improved machine which is adapted to perform these coining and trimming operations on the welds in strip material of varying width without the need for changing the dies, which will coin and trim the weld without jamming and which will provide smooth edges on the material.

It is a more particular object of the invention to provide a coining and trimming apparatus for finishing mash seam welds connecting the ends of metal strip material which is adapted to thin down the weld area and thereafter trim off the resulting thumbnail projections, which is operative without adjustment on material of difference widths, within predetermined limits, which will effect the trimming operation so as to produce smooth edges at the weld area when there has been misalignment of the edges of the material prior to the forming of the weld or when the two ends of the strip are not the same width and the edges could not be aligned prior to welding.

It is another object of the invention to provide a coining and trimming apparatus for finishing welds connecting the ends of metal strips wherein the coining die members have a dimension in the direction across the strip which exceeds the width of the strip material to be handled and the trimming knives are spaced apart a distance greater than the width of the strip material and wherein means is provided for automatically operating the dies and shifting the strip material in a lateral path so as to first perform the coining operation and then trim off the projecting material at opposite sides of the strip material by successive cutting operations, and finally, ejecting the trimmed material from the machine.

It is still another object of the invention to provide a weld coining and trimming machine wherein the weld area at the connected ends of strip material is operated on by a pair of reciprocating coining die and strip edge trimming devices with the movement of the devices automatically controlled and the strip material automatically shifted in timed relation so as to perform the coining operation and the removal of excess material along the edges of the strip at the opposite ends of the weld area in three successive steps.

These and other objects and advantages of the invention will be apparent from a consideration of the machine which is shown by way of illustration in the accompanying drawings wherein:

FIGURE 3 is a partial rear elevation, to an enlarged scale, and with portions broken away;

FIGURE 4 is a partial side elevation, to an enlarged scale, and with portions broken away, the view showing the die carrying and supporting elements at the front of the machine;

FIGURE 6 is a horizontal section taken on a plane indicated by the line 6—6 in FIGURES 4 and 5;

FIGURE 7 is a fragmentary view taken on the line 7—7 of FIGURE 4, to a larger scale;

FIGURE 8 is a fragmentary view taken on the line 8—8 of FIGURE 4 to a larger scale.

Figure 1:
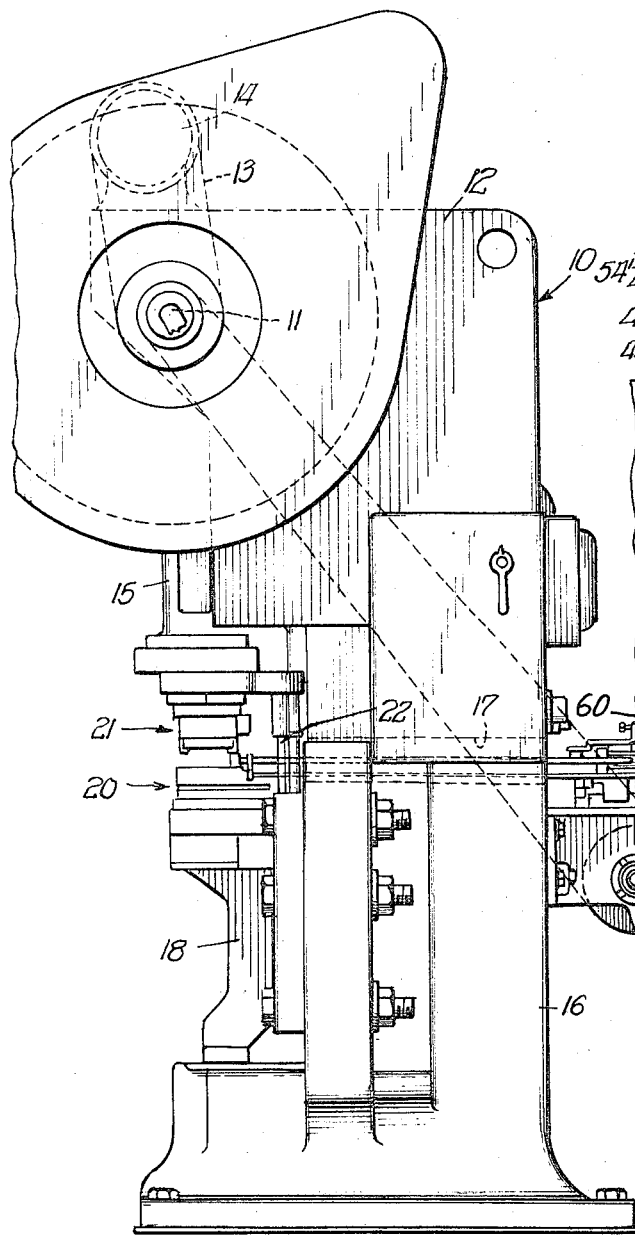
FIGURE 1 is a side elevation with portions broken away of a coin and trim machine which incorporates the principal features of the present invention.

Referring first to FIGURE 1 of the drawings, there is illustrated a machine which incorporates the principal features of the invention and in which the basic frame structure, the upper die support and the power drive mechanism, are of conventional construction commonly found in die presses provided commercially for stamping and forging operations. The machine, in the form illustrated, includes an upright pedestal-like frame structure 10 having a crank shaft 11 journaled between the upper forward margins of top side frame plates 12 at the upper forward portion of the frame 10. The shaft 11 is connected by the chain or belt drive indicated at 13 with a motor 14 forming the main power drive for the machine. The shaft 11 has a suitable driving connection with a vertically disposed slide assembly 15 which is mounted for vertical reciprocation in ways formed between the frame plates 12 at the forward or front side of the machine. The base forming portion 16 of the machine frame has a horn hole 17 extending horizontally from front to back through the base and provision is made for attaching to the front side of the base 16 a specially constructed bracket or knee 18 which projects forwardly of the front face and forms a support for the fixed or stationary portion 20 of a coining die assembly. The movable portion 21 of the coining die assembly is mounted for vertical reciprocation on the slide 15 immediately above the fixed coining die portion 20 on the top face of the knee 18. The press slide 15 is guided in part in its vertical movement by a pair of guide rods 22 (FIGURE 4) depending from the lower face of the slide 15 near the rear edge thereof and slidably received in bores 23 in the top portion of the knee 18, the latter being provided with suitable bearing sleeves in the bores 23.

Figure 2:
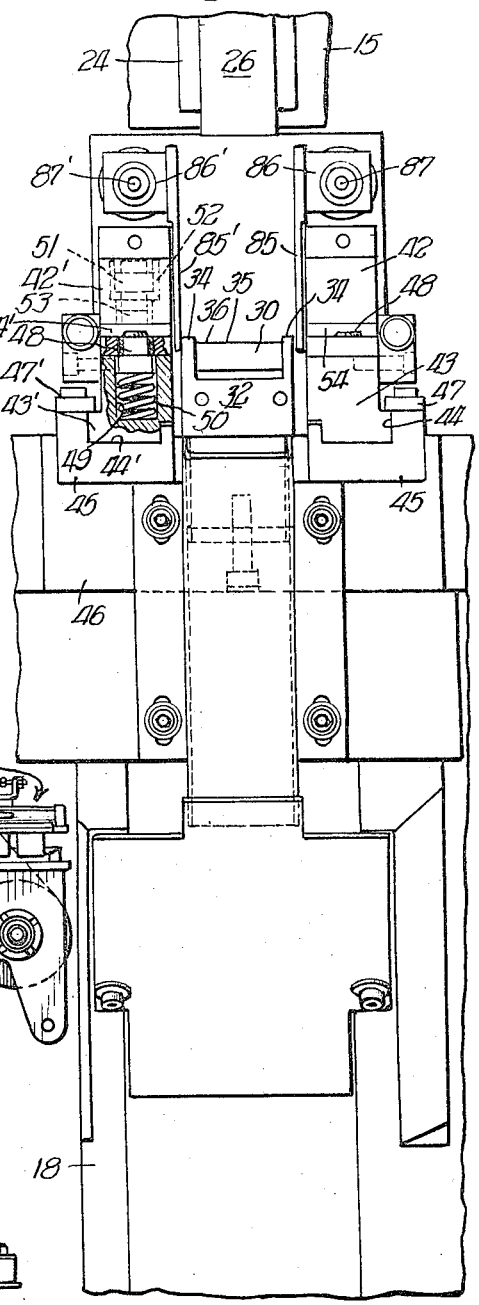
FIGURE 2 is a partial front elevation, to an enlarged scale, showing the die carrying and supporting portion of the machine.

The upper or movable portion 21 of the coining die assembly which is bolted or otherwise secured in depending relation on the lower face of the slide 15 comprises a die block 24 (FIGURES 4 and 7) which is provided on its front and rear edges with recesses 25 and 25' for accommodating edge trimming knives 26 and 26'. The knives 26 and 26' are mounted with their bottom portions extending below the bottom face 27 of the die block 24 and have oppositely disposed cutting edges 28 and 28' which are bowed toward each other and in the direction of the center of the die block 24. The lowermost or fixed coining die assembly portion 20 (FIGURES 2, 4, 6 and 8) is mounted on the top of the rigid knee 18 and comprises a coining die block member 30 seated in a recess 31 with the front and rear edges bowed toward each other for co-operation with the cutting or trimming edges 28 and 28' on the trimming knives 26 and 26' on the upper die assembly portion 21. Work positioning stop plates 32 and 32' are secured on the front and rear faces of the die block member 30 which provide spaced pairs of stop members 34 and 34' projecting above the top face 35 of die block member 30. The stop members of each pair thereof are spaced from each other so that they are at the corners of die block 30 with trimming edges 36 and 36' extending between the same and the space between the stop members of each pair thereof is sufficient to accommodate the trimming knives 26 and 26' on the upper die block 24. The dimensions of the die blocks or punch members 24 and 30, in the direction normal to the fornt face of the machine, that is, between the trimming edges 28, 36 and 28', 36' is somewhat greater than the maximum width of the work piece which the machine A work clamping and shifting mechanism, indicated at 40 (FIGURES 2, 4 and 6) is associated with the fixed die assembly 20. The work clamping device or mechanism extends forwardly of a vertically disposed, carriage forming plate 41 and comprises two spaced pairs of upper and lower clamp arm or bar assemblies 42, 42' and 43, 43'. The lowermost clamp arm forming bar members 43 and 43' are mounted in guideway forming recesses 44 and 44' in elongate guide blocks 45 and 45' set in recesses in the top forming plate 46 on the supporting knee 18 and held therein by gibs 47 and 47'. The bottom clamp arm forming members 43 and 43' are each provided with a plurality of spaced buttons 48 set in vertically extending recesses 49 and backed by compression springs 50 for lifting the workpieces when the coining and trimming operation is completed, as hereinafter described.

The uppermost clamp arms 42 and 42' are each provided with a plurality of spaced air cylinders 51 seated in vertically extending recesses 52 with the pistons 53 arranged to project into the work receiving spaces 54, 54' between the upper and lower clamp arms of each pair thereof so as to grip the work when the cylinders are actuated. The air cylinders 51 are connected through suitable passageways to a compressed air supply line and controlled by suitable electrically operated air valves in the electrical operating circuit for the machine.

Figure 5:
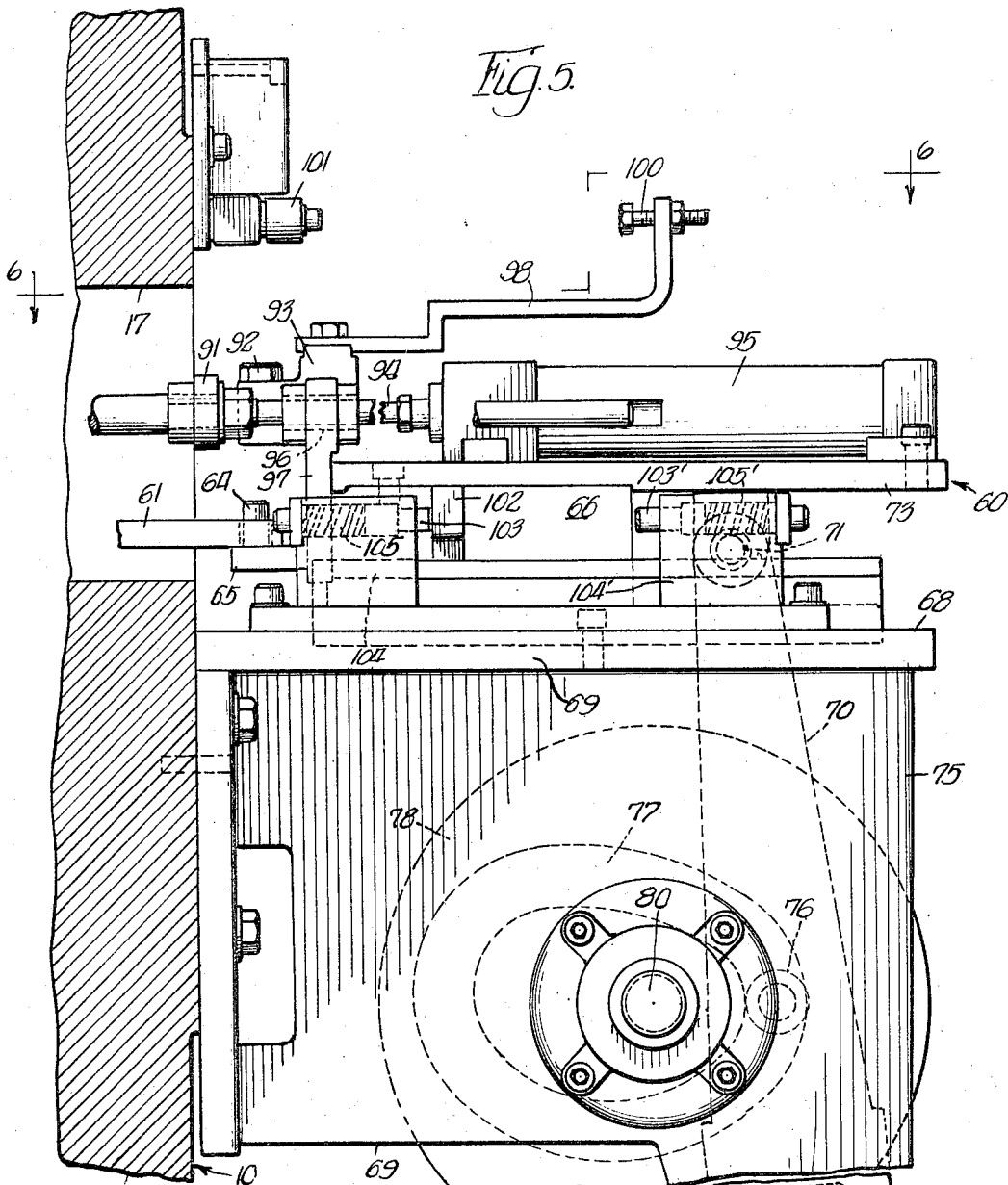
FIGURE 5 is a partial side elevation to an enlarged scale and with portions broken away, the view showing the mechanism at the rear of the machine for shifting and ejecting the work.

The work clamping assembly 40 is connected to a reciprocably mounted slide asesmbly 60 (FIGURES 3, 5 and 6) at the rear of the machine by means of a connecting bar 61 (FIGURES 4 and 6) pivoted at 62 to a bracket 63 extending rearwardly of the vertical plate 41. The connecting bar 61 extends through the horn hole 17 and is pivotally connected at 64 (FIGURE 5) to a bracket 65 on the forward end of the slide block 66. The slide block 66 is mounted in a guideway formed by recess 67 in a block 68 mounted on the upper face of a rearwardly extending bracket 69 which is bolted or otherwise secured to the rear face of the press frame 10 immediately below the horn hole 17. The slide assembly 60 is reciprocated by a lever arm 70 having its upper end connected thereto by a pivot 71 mounted in a bracket 72 depending from a top plate 73 on the slide block 66. The arm 70 has its lower end pivoted on a cross pin 74 extending between the spaced side plates 75 and 75' of the bracket 69. The lever arm 70 carries a cam roller 76 which operates in cam track 77 in a plate cam 78 mounted on a cross shaft 80 journaled in the side plates 75 and 75' and having one end extended on which there is mounted a sprocket 81 (FIGURE 3) connected by a chain 82 with a sprocket 83 on the main power shaft 11.

Figure 9:
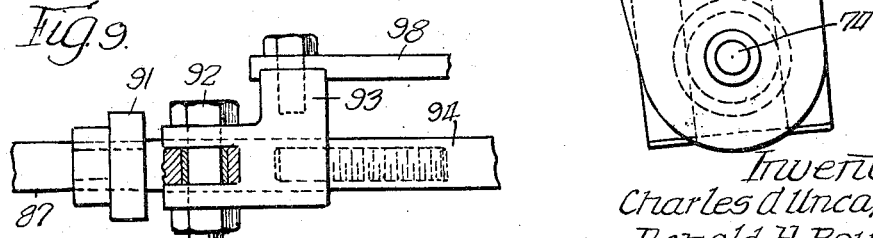
FIGURE 9 is a fragmentary vertical section taken on the line 9—9 of FIGURE 6.

A work ejecting mechanism is associated with the work clamping and shifting assembly 40 which comprises a pair of work engaging fingers or plate members 85 and 85' (FIGURES 2 and 6) depending from bracket plates 86 and 86' secured on the ends of a pair of parallel rods 87 and 87' with the finger plates 85 and 85' depending alongside of the opposed faces of the clamp arm members 42 and 42'. The ejector rods 87 and 87' are slidingly mounted in sleeve bearings 88 and 88' at the upper side of the vertical plate 41 and in like bearings in a supporting bracket 90 (FIGURES 4 and 6) mounted at the entrance to the horn hole 17. The ejector rods 87 and 87' are connected by a cross plate 91 which has a pivotal connection at 92 (FIGURE 9) to a clevis 93 on the forward end of piston 94 which extends from a horizontally disposed air cylinder 95 supported on the top plate 73 which is mounted on the slide block 66. The ejector rods have end portions of reduced size which are received in sleeve bearings 96 and 96' in the upstanding leg 97 of the angle bracket 65 on the slide block 66 which forms a guide plate for the slide bars 87 and 87'. A bracket arm 98 has its forward end secured on the top of the clevis 93 and carries at its free end an adjustable switch operating bolt 100 for engaging the operating button of a switch 101 mounted on the rear face of the frame 10 and controlling an air valve (not shown) for the air cylinder 95. The slide block 66 has a stop member 102 projecting at one side thereof so as to move in a path between a pair of stop pins 103 and 103' mounted in suitable recesses in support brackets 104 and 104' upstanding from the top plate 68 on the bracket 69 and backed by compression springs indicated at 105 and 105'.

The air cylinder control switch 101 is connected into the operating and control mechanism for the machine which includes a valve controlled air supply with suitable connections to the air cylinders 51 and 95, electrical means for supplying current to the main drive motor with suitable controls for starting, stopping, operation of the work clamping and holding members and reciprocation of the coining and trimming die members in timed relation to perform the desired sequence of operations.

In operating the machine, the work piece is positioned in the work receiving spaces 54 and 54' between the upper and lower clamp arms 42, 42' and 43, 43' with the weld area in the space between the two sets of clamp members 42, 43 and 42', 43' which are then actuated to grip the work piece. The uppermost coining die assembly 21 is lowered to engage the weld area so as to perform the coining operation and then raised to permit shifting of the work piece to the first edge trimming position against the rear stop members 34' which project above the top surface of the lower coining die member 30. The slide 15 is then lowered to trim the rear edge of the work piece, removing the thumbnail resulting from the coining operation and any other projecting material. The forwardly bowed cutting edges 28' and 36' co-operate to cut along the edge so as to insure that a smooth edge is obtained, the extent of the bow being relatively small so that the resultant slight indentation in the edge line cannot be observed except upon close examination of the work piece. As the slide 15 is raised the work piece is shifted to the forward edge of the lower die assembly 20 and held against the front stop members 34. The slide 15 is again lowered and the front edge of the work piece is trimmed with the rearwardly bowed cutting edges 28 and 36 co-operating to remove the thumbnail and any other projecting material so as to provide a smooth edge. As the slide 15 is raised the air cylinders 51 are operated to release the work piece for removal from between the clamp arms 42, 43 and 42', 43' and the ejector fingers 85 and 85' are advanced through delayed operation of the cylinder 95 under the control of the switch 101, the switch 101 being tripped upon the forward movement of the slide 66 which carries the work clamp assembly and the switch actuating member 100. The work piece is raised so as to clear the stop members 34 by the lifter pins 48 when cylinders 31 are activated to relieve the clamping pressure on the work piece and the ejector fingers 85 and 85′ sweep across the die assembly portion 20 to carry the work piece out of the machine. The machine is then ready for operating on the next work piece which may be formed of a strip of different width.

While particular materials and specific details of construction are referred to in describing the machine illustrated, it will be understood that other materials and equivalent structural details may be resorted to within the spirit of the invention.

We claim:

1. A machine for reducing the thickness of a lap seam weld connecting the ends of metal strip material and for trimming the side edges of the strip material at the weld area to remove weld portions projecting outside of the normal edges of the strip material which machine comprises an upright press frame and a pair of coining die members, said coining die members being disposed in opposed relation with one die member thereof being mounted for vertical reciprocation between an open and closed position relative to the other die member so as to engage and flatten the thickened weld area of the strip ends when placed between the same, trimming knives at opposite sides of the one die member which co-operate with opposite edges of the other die member to trim material extending outwardly of said edges, stop members on the edges of said other die member which are spaced to clear the trimming knives and which permit projecting weld portions to extend beyond the edges of the dies when the welded strip material is positioned with an edge thereof against the stop members, said trimming knives and said stop members being spaced on opposite sides of the die members a distance which is greater than the maximum width of the welded strip material so that when the welded strip material is positioned between the die members it may be moved laterally in either direction to position the edge thereof against the stop members, means to grip the strip material mounted for reciprocation in a lateral path, and means to reciprocate the die members and the strip gripping means in timed relation so as to first bring the die members together to coin the weld area, then to separate the die members and free the strip material so that it may be shifted laterally to successively position the edges against the stop members at one side of the die member and thereafter against the stop members at the opposite side thereof while the die members reciprocate in timed relation and trim the edges of the strip material.

2. A machine as recited in claim 1, and said trimming knives and the co-operating edges of the die member being bowed in the direction of the center of the die members so as to trim projecting edge portions of the strip material between the stop members on a bowed line and provide a smooth edge at the end of the weld.

3. A machine as recited in claim 1, and said strip gripping means comprising a reciprocably mounted bracket having a slot therein for accommodating the strip material and strip engaging gripper members spaced along the slot so as to grip material of different widths.

4. A machine for reducing the thickness of a lap seam weld connecting the ends of metal strips and for trimming the side edges of the strip at the weld area to remove portions projecting outside of the normal edges thereof which machine comprises an upright support frame and a pair of coining die members, said die members being disposed with confronting work engaging faces, one die member being mounted for reciprocation between an open and closed position relative to the other die member so as to mash a weld placed between the confronting die faces, trimming knives at opposite sides of the one die member which co-operate with cutting edges on the other die member to trim material extending outwardly of said edges, stop members on the edges of said other die member which are spaced to clear the trimming knives and to permit laterally projecting portions of the material to extend beyond the edges of the dies when the welded strip material is positioned with an edge thereof against the stop members, said trimming knives and said stop members being spaced on opposite sides of the die members a distance which is greater than the maximum width of the welded strip so that when the welded strip is positioned between the die members it may be moved laterally in one direction to a position against the stop members at one edge of the die members and then moved in the opposite direction to a position against the stop members at the opposite edge of the die members, strip gripping means mounted for reciprocation in a lateral path so as to shift the strip between the stop members, and means to reciprocate the die members and the strip gripping means in timed relation so as to first bring the dies together to coin the weld area, then to shift the weld area successively from a position against the stop members at one side of the die members to a position against the stop members at the opposite side thereof and to reciprocate the die members in timed relation to the shifting of the strip so as to trim the edges of the strip.

5. A machine as recited in claim 4, and said trimming knives and the edges of the die member co-operating therewith being curved inwardly toward the center of the dies so as to trim the edge of the strip material between the stop members on an inwardly curved line.

6. A machine as recited in claim 4, and reciprocating ejector members mounted to sweep across said die members and eject the strip material.

7. A machine as recited in claim 4, and said strip gripping means comprising spaced pairs of gripper arms with each pair thereof having spaced confronting faces and means to clamp the strip between said faces.

8. A machine as recited in claim 7, and said means to the strip comprising a plurality of spaced reciprocating plungers and means to force the same into engagement with the strip.

9. A machine as recited in claim 4, and said strip gripping means comprising spaced gripper arms having confronting faces and a plurality of reciprocating plungers in the one gripper arm which are operable to clamp the strip against the other gripper arm, and spring pressed pins in said other gripper arm to lift the strip when it is freed by the plungers so as to clear the stop member when it is moved laterally out of said strip gripping means.

10. A machine for reducing the thickness of a lap seam weld connecting the ends of metal strip material and for trimming the side edges of the strip material at the weld area to remove portions projecting outside of the normal edges of the strip material which machine comprises an upright press frame and a pair of pressure applying die members, said die members being disposed one above the other with the uppermost die member being mounted for vertical reciprocation between an open and closed position relative to the lowermost die member so as to reduce the thickened weld area of the strip ends when placed between the same, laterally spaced trimming knives on the uppermost die member and co-operating cutting edges on the lowermost die member for trimming material extending outwardly of said edges, work positioning members on said lowermost die member which permit portions of the material outside the normal edge line thereof to extend beyond a cutting edge on the die member when welded strip material is positioned with an edge thereof in predetermined relation to said work positioning members, means to grip the strip material mounted for reciprocation in a lateral path, and means to reciprocate the die members and the strip gripping means in timed relation so as to first bring the die members into pressure engagement with the weld area so as to reduce the thickness of the same, then to separate the die members and free the strip material so that it may be shifted laterally to successively position the strip material for trimming the edges thereof.

11. A machine for reducing the thickness of a lap seam weld connecting the ends of metal strip members and for trimming the side edges of the strip members at the weld area to remove portions of the material projecting outside of the normal edges of the strip which machine comprises an upright press frame and a pair of pressure applying die members, said die members being disposed one above the other with one die member thereof being mounted for vertical reciprocation between an open and closed position relative to the other die member so as to press a weld placed between the same, edge trimming devices at opposite sides of the traveling die member which co-operate with cutting edges on the other die member to trim material extending outwardly of said edges, strip positioning members on the other die member adapted to permit portions of the material projecting beyond the normal edge line to extend beyond said cutting edges, said edge trimming devices being spaced a distance which is greater than the maximum width of the welded strip so that when the welded strip is positioned between the die members it may be moved laterally relative to said strip positioning members, strip gripping means mounted for reciprocation in a lateral path, and means to operate the die members and the strip gripping means in timed relation so as to first bring the dies into pressure engagement with the strip material so as to reduce the thickness of the weld area, then to shift the strip material successively from a position at one side of the die members to a position at the opposite side thereof and to reciprocate the die members in timed relation to the shifting of the strip material so as to trim the edges of the strip material.

12. A machine as recited in claim 11, and said edge trimming devices and co-perating cutting edges being slightly bowed in the direction of the center of the dies so as to provide a smooth edge on the strip material.

13. A machine as recited in claim 11, and said strip gripping means comprising a reciprocably mounted strip clamping device having a recess for accommodating the strip material and fluid operated strip engaging gripper members.

14. A machine as recited in claim 11, and said strip gripping means comprising a reciprocably mounted strip clamping device with upper and lower jaw forming members, fluid operated members in the upper jaw member for clamping the strip against the lower jaw member member and spring pressed pins in the lower jaw member for lifting the strip member when it is freed by the fluid operated members.

15. A machine as recited in claim 11, and said trimming devices and the co-operating cutting edges of the die member being shaped so as to trim the edges of the strip material and remove portions thereof projecting beyond the normal edge lines of the strip material.

16. A machine as recited in claim 10, and said strip gripping means comprising a reciprocably mounted carriage forming member having means for holding the strip material in predetermined position thereon and means for reciprocating said carriage forming member so as to move the strip material between said work positioning members.

References Cited
UNITED STATES PATENTS

| | | | |
|---|---|---|---|
| 574,227 | 12/1896 | Smith | 72—421 |
| 1,878,201 | 9/1932 | Sundback. | |
| 2,132,853 | 10/1938 | Kearney | 72—338 |
| 2,183,159 | 12/1939 | Chesley | 113—1 |
| 2,834,392 | 5/1958 | Norton | 72—332 |
| 3,120,915 | 2/1964 | Horn et al. | 72—338 |

RICHARD J. HERBST, *Primary Examiner.*

E. M. COMBS, *Assistant Examiner.*

UNITED STATES PATENT OFFICE
CERTIFICATE OF CORRECTION

Patent No. 3,379,045                         April 23, 1968

Charles A. Uncapher et al.

It is certified that error appears in the above identified patent and that said Letters Patent are hereby corrected as shown below:

Column 1, line 50, "difference" should read -- different --. Column 3, line 26, "fornt" should read -- front --; line 28, after "machine" insert -- is designed to handle. --. Column 6, line 39, after "to" insert -- clamp --. Column 7, line 37, "co-perating" should read -- co-operating --. Column 8, lines 10 and 11, cancel "member", second occurrence.

Signed and sealed this 19th day of August 1969.

(SEAL)
Attest:

Edward M. Fletcher, Jr.                    WILLIAM E. SCHUYLER, JR.

Attesting Officer                             Commissioner of Patents